United States Patent [19]

Borman et al.

[11] 4,066,627

[45] Jan. 3, 1978

[54] PRODUCTION OF POLYESTERS

[75] Inventors: Willem F. H. Borman; Eugene P. Reilly, both of Pittsfield, Mass.

[73] Assignee: General Electric Company, Pittsfield, Mass.

[21] Appl. No.: 707,708

[22] Filed: July 22, 1976

Related U.S. Application Data

[63] Continuation of Ser. No. 336,704, Feb. 28, 1973, abandoned.

[51] Int. Cl.$^2$ .................... C08G 63/18; C08G 63/34
[52] U.S. Cl. .................................. 260/75 M; 560/76
[58] Field of Search ...................... 260/75 M, 475 P

[56] References Cited

U.S. PATENT DOCUMENTS

| | | | |
|---|---|---|---|
| 3,639,448 | 2/1972 | Matsuzawa et al. | 260/75 M X |
| 3,836,574 | 9/1974 | Achsel et al. | 260/75 M X |
| 3,859,257 | 1/1975 | Schade et al. | 260/75 M |
| 3,940,367 | 2/1976 | Pelousek et al. | 260/75 M X |

FOREIGN PATENT DOCUMENTS

| | | |
|---|---|---|
| 43-27637 | 11/1968 | Japan. |
| 44-25573 | 10/1969 | Japan. |

*Primary Examiner*—Howard E. Schain
*Assistant Examiner*—W. C. Danison, Jr.
*Attorney, Agent, or Firm*—William F. Mufatti; Edward A. Hedman; Richard J. Mazza

[57] ABSTRACT

Poly(alkylene terephthalates) are prepared by an improved process which provides high molecular weight, in a shortened reaction time, without excessive loss of the diol reactant to side reactions. In the process an excess of the diol reactant is heated with a mixture of the corresponding dialkyl terephthalate and from 5 to 95 mole % of terephthalic acid, based on the mixture.

7 Claims, No Drawings

PRODUCTION OF POLYESTERS

This is a continuation of application Ser. No. 336,704 filed Feb. 28, 1973, now abandoned.

This invention relates to the preparation of polymeric alkylenediol esters of terephthalic acid. More particularly, there is provided an improved process to make such polyesters having a very high molecular weight, in a shortened reaction time, and without excessive loss of the diol reactant to side reactions.

BACKGROUND OF THE INVENTION

High molecular weight linear polyester resins of the poly(alkylene terephthalate) family are known to be superior components in thermoplastic fibers, films and molding compositions, because of their excellent physical properties and surface appearance. The alkylene groups can have from 2 to 10 carbon atoms in the repeating units. Among the most useful such polyesters are poly(ethylene terephthalate), poly(1,3-propylene terephthalate), and poly(1,4-butylene terephthalate) resins. Because the latter crystallizes very rapidly from the melt, it can be formulated into compositions which are moldable in conventional equipment with conventional temperature and cycle times, and without the need to use nucleating agents, and thus is unique in molding compositions.

Poly(alkylene terephthalates) are commonly prepared by either one of two methods:

1. by transesterification of a dialkyl terephthalate, e.g., a (lower), $C_1$–$C_6$ alkyl terephthalate such as dimethyl terephthalate with an excess of the corresponding alkenediol, such as ethylene glycol, 1,3-propanediol, 1,4-butanediol, 1,6-hexanediol, 1,10-decanediol, and the like, followed by polymerization of the intermediate product, splitting off the excess diol at high temperature and vacuum; or 2. by direct esterification of terephthalic acid with an excess of the corresponding alkanediol, followed by a similar polymerization step as in the first method.

The second method is generally recognized to provide a faster rate of polymerization, resulting in economic advantages. In the polymerization of poly(1,4-butylene terephthalate), however, the contact between the 1,4-butanediol and terephthalic acid at high temperature and in the presence of water evolved in the reaction leads to the formation of large quantities of tetrahydrofuran from butanediol as a result of a well-known acid - catalyzed dehydration reaction. A similar side reaction also interferes with the use of other alkanediols. For example, significant amounts of diethylene glycol are formed in the polymerization reaction producing poly(ethylene terephthalate). This glycol becomes incorporated in the poly)ethylene terephthalate) to the detriment of its properties.

It has now been discovered that it is possible to achieve at least partially the enhanced reaction rates obtainable with terephthalic acid and minimize its corresponding disadvantageous side-reactions, when a mixture of di(lower)alkyl terephthalate and terephthalic acid are used in the esterification reaction with an excess of the alkanediol, especially 1,4-butanediol. In this process, there is reacted a mixture of dialkyl terephthalate and terephthalic acid, containing from 5–95 mole %, preferably from 5–25 mole % terephthalic acid with an excess, e.g., as from 110 to 500 mole %, of the alkanediol, based on the mixture.

Because the side reactions are suppressed, the poly-(alkylene terephthalate) resins can be obtained in a very economical fashion by the present process. Moreover, the molecular weights are surprisingly higher than would be expected from the shorter reaction times. In addition, the products may be just as easily compounded and will ultimately provide molded articles with substantially the same superior properties as those made from the best of the prior art polyesters.

DESCRIPTION OF THE INVENTION

According to the present invention, there is provided a process for the preparation of high molecular weight, linear poly(alkylene terephthalate) resins, in a shortened reaction time and with suppression of side reactions, said process comprising:

a. heating at a temperature in the range of from about 150° C. to about 300° C. a reaction mixture comprising an excess of the corresponding alkanediol, a di(lower-)alkyl terephthalate and terephthalic acid, the proportion of reactants satisfying the following equation:

$$\frac{\text{No. of moles of alkanediol}}{\text{No. of moles of TA (95-5 mole \% DAT + 5-95 mole \% TPA)}} = 1.1 \text{ to } 5.0$$

wherein TA is the terephthalate mixture, DAT is the dialkyl terephthalate and TPA is terephthalic acid; and b. removing the excess alkanediol and (lower)alcohol and water byproducts until a high molecular weight resin is formed.

In preferred embodiments, the proportion of reactants will satisfy the following equation:

$$\frac{\text{No. of moles of alkanediol}}{\text{No. of moles of TA (95-5 mole \% DAT + 5-95 mole \% TPA)}} = 1.25 \text{ to } 2.0$$

In especially preferred embodiments, the proportion of reactants will satisfy the following equation:

$$\frac{\text{No. of moles of alkanediol}}{\text{No. of moles of TA (95-75 mole \% DAT + 5-25 mole \% TPA)}} = 1.1 \text{ to } 5.0;$$

and preferably 1.25 to 2.0

A preferred feature of the invention will include the use of 1,4-butanediol as the akanediol and dimethyl terephthalate as the di(lower)alkyl terephthalate. Preferably, the reaction steps will be carried out at atmospheric pressure or subatmospheric pressure, e.g., as can be reached with aspirators and pumps.

Still another preferred feature is to carry out the process with alcoholysis of alkanediol and terephthalate mixture at atmospheric pressure and then to heat the product only until a pre-polymer is obtained and thereafter heating the same under higher temperatures and lower pressures until the polyester product is obtained.

Still other preferred features are to include polyesterification catalysts in the reaction mixture to shorten the time of contact between the unreacted alkanediol and terephthalic acid. Any conventional catalyst, e.g., a titanium, tin, antimony and the like compound can be used, and in conventional amounts. For example, 0.01 to 1.0 mole % of tetrabutyl titanate or tetraoctyl titanate, tetrabutyl tin, antimony oxide and the like can be added. Preferbly, the polyesterification catalyst will be an organo-titanium or an organo-tin compound, and especially preferably the catalyst will be tetraoctyl titanate or tetrabutyl titanate.

The high molecular weight, linear poly(alkylene terephthalate) resins produced by the improved process of this invention can include small amounts, e.g., of up to about 15 mole % of groups derived from alkanediol mixtures, such as ethylene glycol, 1,3-propanediol, 1,4-butanediol, 1,4-dimethylol cyclohexane, and the like, or polyols, such as glycerol, and other diacids, e.g., isophthalic acid, succcinic acid, naphthalene dicarboxylic acid, and the like.

The molecular weight in the final product will be sufficiently high to provide an intrinsic viscosity of from about 0.7 to about 2.0 deciliters per gram, measured, for example, as a solution in a 60:40 mixture of phenol and tetrachloroethane at 30° C.

These high molecular weights are attainable in only about ½ to 3 hours under high vacuum, whereas ordinarily about 4 or 5 hours are required.

With respect to the process steps and reagents, in one manner of proceeding, the commercially available alkanediol, dialkyl terephthalate and terephthalic acid are mixed in the specified proportion and heated in a suitably sized reaction vessel, preferably mechanically stirred and purged with an inert gas, e.g., nitrogen. Optionally, but preferably, a polyesterification catalyst is included. The mixture is heated, for example, at a temperature in the range of from 150° C. to about 300° C. and the byproduct (lower)alcohol, e.g., methanol, and water are distilled off and as soon as the mixture becomes clear (½ hour to several hours, depending primarily on the temperature), the excess alkanediol is removed by applying a vacuum to the reactor, e.g., 28 inches of Hg. After most of the alkanediol (1,4-butanediol or other diol, as the case may be) has been removed, the temperature is raised, e.g., to 240°–300° C., preferably 250°–260° C. (in the case of poly(1,4-butylene terephthalate)), and the pressure is lowered, e.g., to 0.1 – 1.0 mm Hg, and reaction is continued under these conditions by distilling off byproduct 1,4-butanediol (or other alkanediol as the case may be) until a highly viscous polymer of the desired molecular weight is obtained. This step will require from about ½ hour to about 3 hours, depending on the reaction conditions. The resinous product is recovered from the reaction vessel by conventional methods.

DESCRIPTION OF THE PREFERRED EMBODIMENTS

The following examples illustrate the preparation of polyester resins according to the novel process of the present invention. For comparison purposes, several procedures are set forth to demonstrate the improvements obtained by proceeding in the specified manner. The examples are not to be construed to limit the invention in anyway whatsoever.

EXAMPLE 1

A 300 ml 3-neck reaction flask, equipped with mechanical stirrer, a short fractionation column, and a downward condenser is charged with 87.3 g. of dimethyl terephthalate (0.45 mole), 8.3 g. of terephthalic acid (0.05 mole, 10 mole %), 81.5 g. of 1,4-butanediol (0.9 mole, 1.8/1 ratio to combined terephthalates) and 0.05 ml. of tetraoctyl titanate.

The flask is immersed in an oil bath and heated over a period of three hours at a temperature increasing gradually from 170° to 245° C. At that time, vacuum is gradually applied to remove the excess butanediol (20 minutes), and then the flask was heated at 255°–256° C. under a vacuum of 0.1 mm Hg for 1½ hours. The colorless product has an intrinsic viscosity (in 60:40 phenotetrachloroethane at 30° C.) of 1.36 dl./g.: its residual COOH content is 6 meq/kg. After analysis of recovered reaction distillates, the butanediol used in the reaction is found to be 23% in excess of the theoretical amount.

Comparative Procedure A

In a procedure similar to Example 1, 0.50 mole of dimethyl terephthalate is reacted with 0.90 mole of 1,4-butanediol in the presence of 0.05 ml. of tetraoctyl titanate, but without the presence of terephthalic acid. The final polymerization stage requires 2 hours (instead of 1½ hours in Example 1) to yield a comparable product: IV = 1.41 dl./g.; COOH content 8 meq/kg. Butanediol usage is 23% in excess of the theoretical amount required.

Comparative Procedure B

In a second procedure, 83.3 g. of terephthalic acid (0.5 mole), 135 g. of 1,4-butanediol (1.5 mole), and 0.15 ml. of tetrabutyl titanate are reacted at 250° C. for 1 hour, resulting in a clear melt. During the following ¾ hour, excess butanediol is distilled in vacuum; the vacuum is then lowered to 0.7 mm. and the temperature is raised to 257° C. for 50 minutes, resulting in a clear polymer with an intrinsic viscosity of 1.50 dl./g., and a COOH content of 30 meq/kg. Although this reaction is faster than the previous ones, the butanediol usage is calculated to be 63% in excess over the theoretical amount, considerably higher than the previous example, and indicating a significant loss of this expensive ingredient to side reactions.

EXAMPLE 2

A 20-gallon stainless steel reactor is charged with 31.8 lbs. of dimethyl terephthalate (0.164 lb. mole), 3.53 lbs. of terephthalic acid (0.021 lb. mole, 11.35 mole %), 28.5 lbs. of 1,4-butanediol (0.317 lb. mole), and 8.0 g. of tetraoctyl titanate. The charge is heated at 190° C. for 1 hour and 20 minutes; excess butanediol is then removed under vacuum over the next 20 minutes, and the prepolymer is transferred to a 10-gallon polymerization reactor. The polymerization takes place at 248°–256° C. and 1.2 to 0.3 mm Hg over a period of 2 hours, resulting in a product with an intrinsic viscosity of 1.17 dl./g. The amount of butanediol used, less the amount recovered, is 10% in excess of the theoretical amount required.

Comparative Procedure C

In the same apparatus as in Example 2, 35.3 lbs. of dimethtyl terephthalate (0.182 lb. moles), 28.5 lbs. of 1,4-butanediol (0.317 lb. moles) and 8.0 g. of tetraoctyl titanate are polymerized. Transesterification requires 2 hours at 120°–162° C. Excess butanediol is removed over a 40 minute period, and polymerization takes place in 2½ hours at a temperature of up to 256° C. and a vacuum down to 0.2 mm Hg. The product has an intrinsic viscosity of 1.12 dl./g. The amount of butanediol used, less the amounts recovered in the distillates, is 10% over the theoretical amount required.

Other modifications of Examples 1 and 2 provide processes within the scope of this invention.

For example, for the 1,4-butanediol, substitute ethylene glycol 1,3-propanediol, 1,6-hexanediol and 1,10-decanediol. For the terephthalic acid, substitute a 98/2 mixture of terephthalic acid and isophthalic acid; for the dimethyl terephthalate, substitute 99/1 mixture of dimethyl terephthalate and dimethyl adipate; for 1,4-butanediol, substitute a 98/2 mixture of butanediol and glycerine. For the dimethyl terephthalate, substitute diethyl terephthalate and di(n-hexyl)-terephthalate.

Because of their excellent physical, mechanical, chemical, electrical and thermal properties, the polyesters produced by the process of this invention have many and varied uses. They may be used alone as molding powders or mixed with other polymers and may contain fillers, both reinforcing, such as glass filaments, and non-reinforcing, such as wood flour, cloth fibers, clays and the like, as well as flame retardants, pigments, dyes, stabilizers, plasticizers, etc.

Obviously, other modifications and variations of the present invention are possible in the light of the above teachings. It is therefore to be understood that changes may be made in the particular embodiments of the invention described which are within the full intended scope of the invention as defined by the appended claims.

We claim:

1. A process for the preparation of a linear poly(1,4-butylene terephthalate) resin, said process comprising:
   a. heating at a temperature in the range of from about 150° to about 300° C. a reaction mixture comprising an excess of 1,4-butanediol, dimethyl terephthalate and terephthalic acid, the proportions of the reactants satisfying the following equation:

$$\frac{\text{No. of moles of 1,4-butanediol}}{\text{No. of moles of TA}} = 1.25 \text{ to } 2.0$$
$$(95 - 75 \text{ mole } \% \text{ DTA} + 5 - 25 \text{ mole } \% \text{ TPA})$$

wherein TA is the terephthalate mixture, DAT is dimethyl terephthalate and TAP is terephthalic acid; and
   b. removing the excess 1,4-butanediol and methanol and water byproducts until a high molecular weight resin is formed.

2. A process as defined in claim 1 wherein the heating is carried out at atmospheric or subatmospheric pressure.

3. A process as defined in claim 1 wherein the reaction mixture also includes a polyesterification catalyst.

4. A process as defined in claim 3 wherein said catalyst is tetraoctyl titanate or tetrabutyl titanate.

5. A process for the preparation of a linear poly(1,4-butylene terephthalate) resin, said process comprising:
   a. heating at a temperature of from about 150° to about 300° C. a mixture of dimethyl terephthalate and from about 5 to about 25 mole % of terephthalic acid based on said mixture and from about 125 to about 200 mole percent, based on said mixture, of 1,4-butanediol until methanol and water substantially cease to be evolved;
   b. applying a vacuum and continuing the heating until the excess 1,4-butanediol substantially ceases to be evolved; and
   c. continuing the heating under vacuum and removing byproduct 1,4-butanediol until a high molecular weight resin is formed.

6. A process as defined in claim 5 wherein the reaction mixture also includes a polyesterification catalyst.

7. A process as defined in claim 6 wherein said polyesterification catalyst is tetraoctyl titanate or tetrabutyl titanate.

* * * * *

UNITED STATES PATENT AND TRADEMARK OFFICE
CERTIFICATE OF CORRECTION

PATENT NO. : 4,066,627
DATED : January 3, 1978
INVENTOR(S) : Willem F.H. Borman et al It is certified that error appears in the above-identified patent and that said Letters Patent are hereby corrected as shown below:

In Col. 6, lines 1-4, the left hand side of the equation, $$\text{"}\quad \frac{\text{No. of moles of 1,4-butanediol}}{\text{No. of moles of TA}} \quad \text{"}$$
$$(95 - 75 \text{ mole \% DTA} + 5 - 25 \text{ mole \% TPA})$$

should read $$-- \quad \frac{\text{No. of moles of 1,4-butanediol}}{\text{No. of moles of TA } (95 - 75 \text{ mole \% DAT} + 5 - 25 \text{ mole \% TPA})} \quad --$$

Signed and Sealed this

Sixth Day of June 1978

[SEAL]

Attest:

RUTH C. MASON
Attesting Officer

DONALD W. BANNER
Commissioner of Patents and Trademarks